Dec. 26, 1939.    E. F. MARTINET    2,184,881
TUBULAR COUPLING FOR SUCTION CLEANERS AND THE LIKE
Filed March 19, 1937
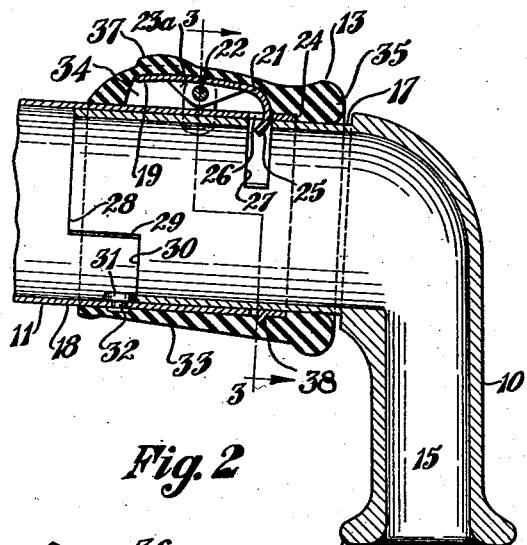
Fig. 2
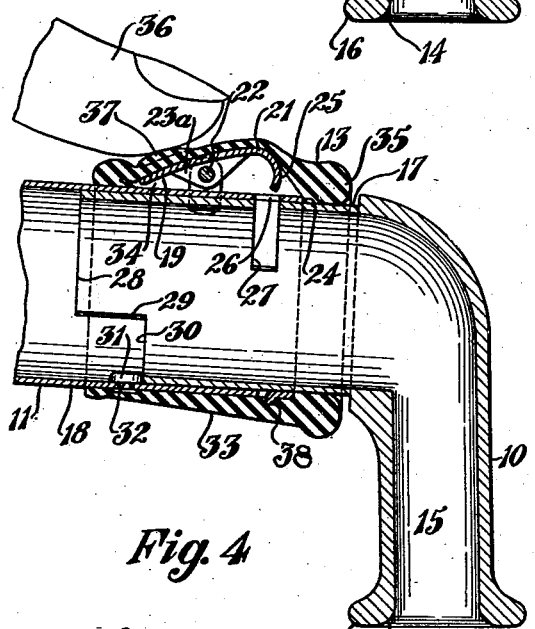
Fig. 4
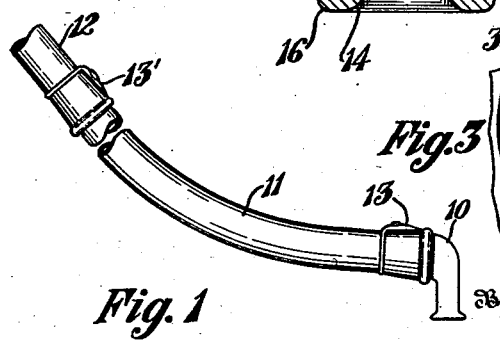
Fig. 1
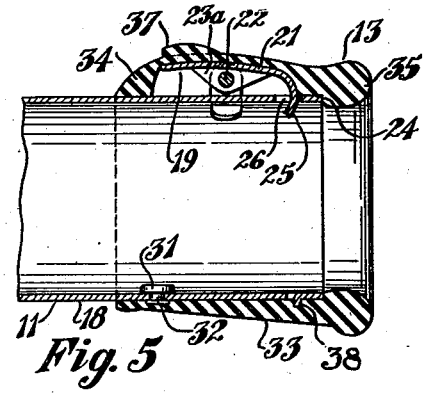
Fig. 5
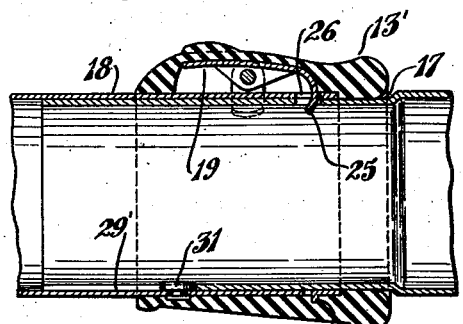
Fig. 6
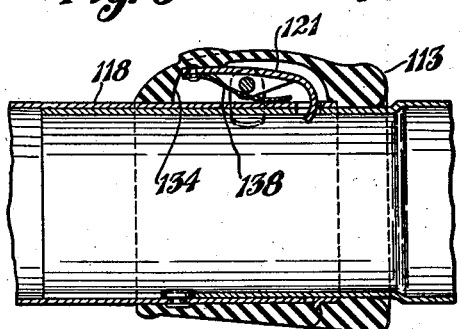
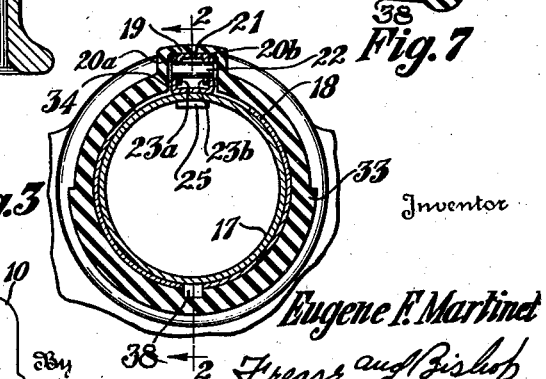
Fig. 7
Fig. 3
Inventor
Eugene F. Martinet
By Frease and Bishop
Attorneys Patented Dec. 26, 1939

2,184,881

UNITED STATES PATENT OFFICE 2,184,881

TUBULAR COUPLING FOR SUCTION CLEANERS AND THE LIKE

Eugene F. Martinet, Cleveland, Ohio, assignor to The P. A. Geier Company, Cleveland, Ohio, a corporation of Ohio Application March 19, 1937, Serial No. 131,857

6 Claims. (Cl. 285—170)

My invention relates to tubular couplings or connectors more particularly adapted for use in suction cleaners for providing detachable, and when desired swivel, air-tight connections between attachment hose, tubes, nozzles, and the like.

For such purposes it has been a general practice to use either some type of taper connection or some type of slip joint.

Taper connections have the advantage of being air-tight, but are extremely difficult and time consuming to separate when put together tight enough so as not to fall apart during normal operation of the suction cleaner and its attachments.

On the other hand, it is difficult to make tapers on the various parts which may be selectively assembled with each other so as to properly fit each other in the various combinations in which the parts may be assembled.

The use of some type of slip joint with some type of a locking latch overcomes the disadvantage of difficult and time consuming assembly and disassembly, but such a slip joint is subject to air leakage losses. Particularly in a tank type suction cleaner, wherein the fan and dust collector are located in a tank which is positioned from place to place during use and which is connected by a flexible hose and sometimes a tubular handle with a cleaning nozzle which is manually manipulated over the surface being cleaned, and wherein the suction is extremely high and there is a relatively low volume of air movement, air leakage losses are a serious disadvantage, and consequently the usual type of slip joint tubular coupling or connector for the tank type cleaner is not desirable.

In the taper type of tubular connection the provision of a swivel at the connection, also usually requires the use of swiveling parts in addition to the interfitting taper parts.

The objects of the present improvements include the provision of improved tubular couplings particularly adapted for use in suction cleaners which have the ease and quickness of assembly and disassembly of slip joint lock type connectors, and which at the same time are substantially air-tight so as to eliminate substantially all air leakage.

Further objects of the present improvements include the provision of improved locking tubular couplings which may be arranged as may be desired either for swiveling or non-swiveling, by the construction and arrangement of the coupling parts in themselves, and without the use of additional swiveling parts.

Further objects of the improvements include the provision of an air-tight locking tubular coupling having a simplified arrangement of parts permitting economical manufacture, and convenience in use.

The foregoing and other objects are attained by the tubular couplings, parts, combinations, and sub-combinations, which comprise the present invention and the nature of which is set forth in the following general statement, and preferred embodiments of which are set forth in the following description, and which are particularly and distinctly pointed out and set forth in the appended claims forming part hereof.

The nature of the improved tubular coupling of the present invention may be stated in general terms as including separable telescoping tubular sleeves, releasable quick acting locking latch means operatively associated with the sleeves, and arranged for swiveling of the sleeves when desired, preferably stop means limiting the longitudinal movement of the sleeves in one direction, and also when desired arranged for swiveling of the sleeves, and a resilient preferably rubber sleeve located on one of the telescoping sleeves in air-tight engagement therewith, preferably on the outermost telescoping sleeve, the rubber sleeve extending about and enclosing the latch parts and extending beyond the end of the sleeve upon which it is mounted for removable air-tight engagement with the other sleeve when the telescoping sleeves are in telescoped and connected position.

The rubber sleeve may be arranged so as to normally maintain the latch parts in locking position, or clearance may be provided between the rubber sleeve and the latch parts, and separate spring means may be utilized for normally maintaining the latch parts in locking position.

By way of example, embodiments of the improved tubular couplings or connectors hereof are illustrated in the accompanying drawing forming part hereof, in which Figure 1 is a fragmentary elevation view illustrating a suction cleaner nozzle and two sections of tubes, one of which as shown is curved, the nozzle being connected with one end of the curved tube by one of the improved tubular couplings hereof, and the other end of the curved tube being also connected with the adjacent end of the other tube by one of the improved tubular couplings hereof;

Fig. 2, an enlarged sectional view of the nozzle and its tubular coupling of Fig. 1, the section being a vertical transverse median section of the nozzle and a vertical longitudinal axial section of the coupling as on line 2—2, Fig. 3, and the coupling being a swivel coupling;

Fig. 3, a transverse section of the coupling of Fig. 2, as on line 3—3, Fig. 2;

Fig. 4, a view similar to Fig. 2 illustrating the method of manipulating the releasable latch means of the coupling of Fig. 2 for separating the tubular members of the coupling;

Fig. 5, a view similar to Fig. 2, showing the outer telescoping tubular member of the coupling having latch parts operatively mounted on its outer portions and having the resilient circumferential closure sleeve of the present improvements, all separated from the inner telescoping tubular member of the coupling;

Fig. 6, a longitudinal axial section of another embodiment of the improved tubular coupling hereof in the form of a non-swiveling coupling, and which may be the other or upper coupling of Fig. 1; and Fig. 7, a view similar to Fig. 6 showing another embodiment of the improved tubular coupling hereof.

Similar numerals refer to similar parts throughout the drawing.

In Fig. 1 is shown a suction cleaner nozzle 10 which may be for a tank or stationary type suction cleaner, a curved tube section 11 and a straight tube section 12. The nozzle 10 is connected with the adjacent or lower end of the curved tube section 11 by one swiveling embodiment 13 of the improved tubular coupling hereof, parts of which are formed by tubular members comprising integral portions of the nozzle 10 and the curved tube section 11; and the other or upper end of the curved tube section 11 is connected with the adjacent end of the straight tube section 12 by another non-swiveling embodiment 13' of the improved tubular coupling hereof, parts of which are formed by tubular members comprising integral portions of the tube sections 11 and 12.

The other end of the tube section 12, not shown, is connected with the intake side of suction creating means, such as the intake chamber of the housing of a centrifugal suction fan, as is usual in a suction cleaner, not shown.

The nozzle 10 includes an entrance 14 for its mouth 15, the entrance 14 having an engirdling lip 16 arranged to be moved across a surface to be cleaned in the usual manner.

The nozzle 10 furthermore includes integral therewith a tubular member 17 communicating at one end with the nozzle mouth 15 and comprising a part of the improved swiveling tubular coupling 13.

The adjacent end portion of the tube section 11 comprises a tubular member 18 which is also a part of the improved tubular coupling 13.

The tubular members 17 and 18 of the tubular coupling 13 are separable and are registerable with each other for providing a passageway from the one into the other, preferably by telescoping the tubular member 17 into the tubular member 18.

Releasable quick acting latch means are preferably provided for releasably swivel connecting the tubular members 17 and 18 with each other in telescopic registration and providing a passageway from the one into the other, and as shown the connecting means includes swivel latch means indicated generally by 19 and including interengageable parts on the tubular members 17 and 18, the parts operatively mounted on the outer portion of the sleeve member 18 comprising opposite bracket tongues 20a and 20b which may be sheered and struck out from the sleeve member 18 as best shown in Fig. 3. A latch lever 21 is pivotally mounted intermediate its ends between and, on the tongues 20a and 20b, as by the pivot pin 22 extending through registering apertures in the tongues 20a and 20b and wings 23a and 23b of the latch lever 21.

Preferably the end of the latch lever 21 adjacent the extremity 24 of the tubular member 18 is provided with a downwardly curved and extending latch hook 25.

The tubular member 18 has formed therein an aperture 26 through which the pivoted latch hook 25 may extend into and out of, and the preferably telescoping tubular member 17 has formed therein a relatively wide swiveling and engaging slot 27 which is adapted to register with the aperture 26 of the tubular member 18, when the tubular member 17 is telescoped within the tubular member 18, and so that the latch hook 25 may extend into and in locking position in the slot 27 of the sleeve 17, which being relatively wide permits swiveling movement between the tubular members 17 and 18.

The tubular members 17 and 18, as well as the nozzle 10 are preferably made of rigid material, such as metal, and so as to conveniently transmit the thrust of the handle or tube section 11 upon the nozzle 10 in ordinary use of the nozzle 10, the tubular member 17 has formed in its outer end 28 a relatively wide notch 29 having a bottom circumferential face 30 against which may abut the head 31 of a rivet 32 which is secured in the tubular member 18, the rivet head 31 being located against the inner circumferential surface of the tubular member 18.

For attaining the purposes of the present improvements, the coupling 13 furthermore includes a resilient preferably rubber sleeve 33 mounted so as to make a circumferential closure engagement on one of the tubular members of the coupling 13, as shown about the outer surface of the tubular member 18.

The resilient sleeve 33 extends from its circumferential closure about the outer surface of the tubular member 18 over the latch lever 21 pivotally mounted on the tongues 20a and 20b, the resilient sleeve 33 being preferably formed in its inner surface with a pocket 34 for receiving and fitting the latch lever 21 and pivotal mounting tongues 20a and 20b. Thus the latch lever 21, being in the pocket 34 of the sleeve 33, secures the sleeve 33 to the tubular member 18; and if desired the sleeve 33 may be further secured to the member 18 by the angular tang 38.

The resilient sleeve 33 also extends from the tubular member 18 upon which it is mounted and effects a circumferential closure engagement, so as to make a resilient circumferential closure engagement preferably about the outer surface of the tubular member 17 when the same is telescoped within the tubular member 18, and for this purpose the resilient sleeve 33 preferably extends beyond the extremity 24 of the tubular member 18 and preferably terminates as illustrated in an enlarged resilient gripping ring mouth 35.

The shape of the resilient sleeve 33 and of the pocket 34 therein is such that the resilient sleeve normally urges the latch lever hook 25 inwardly towards the longitudinal axis of the tubular members of the coupling 13 so as to automatically maintain a locking position of the latch lever 21 as best shown in Fig. 2.

In Figs. 1, 2, and 3 the tubular members 17 and 18 of the coupling 13 are shown in telescoped and swivel locked position in which the latch hook 25 extends through the aperture 26 of the tubular member 18 and the relatively wide slot 27 of the tubular member 17, thereby locking the same against longitudinal displacement in normal use, but permitting swiveling of the tubular members 17 and 18 with respect to each other, by reason of the relatively wide slot 27. The resilient sleeve 33 effects a substantially air-tight circumferential closure about the outer surface of the tubular member 18, and also the gripping ring mouth 35 thereof effects a substantially air-tight resilient circumferential closure engagement about the entire outer circumferential surface of the tubular member 17.

When it is desired to separate the tubular members 17 and 18 of the coupling 13, the thumb or finger 36 of an operator may push upon the resilient sleeve 33 as upon a protuberance 37 provided thereon located over the latch lever 21 at the side of its pivot pin 22 opposite to the latch hook 25, thereby withdrawing the latch hook 25 from the registering slot 27 of the tubular member 17 and the aperture 26 of the tubular member 18, as shown in Fig. 4, whereupon the tubular member 18 and the latch parts and the resilient sleeve 33 carried thereby may be conveniently and quickly withdrawn and separated from the tubular member 17, as shown in Fig. 5.

The non-swiveling improved tubular coupling 13' illustrated in Figs. 1 and 6 hereof is generally similar to the coupling 13, with the exception that in the coupling 13' the notch or slot 29' in the tubular member 17 is not wide enough with respect to the width of the rivet head 31 to permit swiveling of the tubular members 17 and 18 with respect to each other.

The embodiment of the improved tubular coupling illustrated in Fig. 7 and indicated generally by 113 is generally similar to the coupling 13', with the exception however that in the coupling 113 the cavity 134 for the latch lever 121 is provided with clearance so as not to urge the latch lever 121 into latching position.

In the coupling 113, spring means 138 are interposed between the latch lever 121 and the tubular member 118 and normally urge the latch lever 121 into latching position.

The embodiments of the present improvements illustrated and described herein are by way of example, and the scope of the present invention is not limited to the same or to the particular details thereof, but is commensurate with any and all novel subject matter contained herein which may at any time properly under the United States patent laws be set forth in claims hereof or originating herein, the elements of any of such claims being intended to include their reasonable equivalents.

As shown in Fig. 5, the ring mouth or portion 35 of the preferred resilient sleeve 33 when the same is removed from the tubular member 17, has an internal circumference which is less than the external circumference of the tubular member 17, so as to provide for the resilient circumferential closure of the ring mouth 35 about the outer surface of the tubular member 17 when the tubular members 17 and 18 are coupled together.

While it is preferred as shown that the sleeve 33 be made entirely of resilient material, the sleeve 33 may be made in part of rigid or non-resilient material, but in any event the ring mouth 35 of the closure sleeve 33 is such as to effect a resilient circumferential closure engagement about the outer surface of the tubular member 17 when the coupling tubular members are connected.

I claim:

1. A tubular coupling including separable tubular members which are arranged for telescoping one within the other for providing a passageway from the one into the other, means associated with the tubular members for releasably connecting the telescoped tubular members with each other, and a closure sleeve mounted so as to make a circumferential closure on one of the tubular members and extending beyond the end thereof and associated with the connecting means and having a ring portion adapted to make a resilient circumferential closure engagement with the other tubular member when the tubular members are telescoped and connected with each other, the connecting means including a latch lever pivotally mounted on one of the tubular members under the sleeve and having upon one end a latch hook, and the tubular members having apertures therein arranged to register with each other and to receive the latch hook.

2. A tubular coupling including separable tubular members which are arranged for telescoping one within the other for providing a passageway from the one into the other, means associated with the tubular members for releasably connecting the telescoped tubular members with each other, and a closure sleeve mounted so as to make a circumferential closure on one of the tubular members and extending beyond the end thereof and associated with the connecting means and having a ring portion adapted to make a resilient circumferential closure engagement with the other tubular member when the tubular members are telescoped and connected with each other, the connecting means including a latch lever pivotally mounted on one of the tubular members and having upon one end a latch hook, and the tubular members having apertures therein arranged to register with each other and to receive the latch hook, the tubular member without the latch lever having a relatively wide aperture to permit swiveling of the tubular members with respect to each other and when latch connected with each other.

3. A sealed tubular coupling for suction tubes including separable tubular members which are arranged for association one with the other for providing an air passageway from the one into the other, releasable quick acting latch means including interengageable parts on the tubular members for releasably connecting the tubular members with each other, and a closure sleeve having a portion making a circumferential closure on one of the tubular members and extending beyond the end thereof and having beyond said end a resilient gripping ring portion which has a different circumference than the other tubular member so as to make a gripping closure engagement with the entire circumference of the other tubular member when the tubular members are connected with each other.

4. A sealed tubular coupling for suction tubes including separable tubular members which are arranged for association one with the other for providing an air passageway from the one into the other, releasable quick acting latch means including interengageable parts on the tubular members for releasably connecting the tubular members with each other, and a closure sleeve extending over the releasable connecting means and having a portion making a circumferential closure on one of the tubular members and extending beyond the end thereof and having beyond said end a resilient gripping ring portion which has a different circumference than the other tubular member so as to make a gripping closure engagement with the entire circumference of the other tubular member when the tubular members are connected with each other.

5. A sealed tubular coupling for suction tubes including separable tubular members which are arranged for association one with the other for providing an air passageway from the one into the other, releasable quick acting latch means including interengageable parts on the tubular members for releasably connecting the tubular members with each other, and a resilient closure ring including circumferential faces in air sealing engagement with the tubular members when the tubular members are connected with each other.

6. A sealed tubular coupling for suction tubes including separable tubular members which are arranged for association one with the other for providing an air passageway from the one into the other, releasable quick acting latch means including interengageable parts on the tubular members for releasably connecting the tubular members with each other, and a resilient closure ring including circumferential faces in air sealing engagement with the tubular members when the tubular members are connected with each other, the releasable quick acting latch means including a push member for rapid actuation of the same.

EUGENE F. MARTINET.